United States Patent [19]

Wismer-Pedersen, deceased et al.

[11] Patent Number: 5,151,500
[45] Date of Patent: Sep. 29, 1992

[54] PROCESS FOR PRODUCING A SUBSTANTIALLY HEME-FREE BLOOD PROTEIN

[76] Inventors: Jorgen Wismer-Pedersen, deceased, late of Roskilde; Jorn Frohlich, legal representative, Advokatfirmaet Kielberg, Hunderupvej 71, DK-5100 Odense C, both of Denmark

[21] Appl. No.: 469,557

[22] PCT Filed: Jul. 26, 1988

[86] PCT No.: PCT/DK88/00127
§ 371 Date: Mar. 29, 1990
§ 102(e) Date: Mar. 29, 1990

[87] PCT Pub. No.: WO89/00816
PCT Pub. Date: Feb. 9, 1989

[30] Foreign Application Priority Data

Jul. 30, 1987 [DK] Denmark ............................ 3989/87

[51] Int. Cl.⁵ .......................... A61K 35/14; A23J 1/06; C07K 3/24
[52] U.S. Cl. ................... 530/385; 530/419; 530/420
[58] Field of Search ............. 530/385, 419, 420; 514/6

[56] References Cited

U.S. PATENT DOCUMENTS

| | | | |
|---|---|---|---|
| 1,415,277 | 5/1922 | Terwen et al. | 530/385 |
| 2,466,710 | 4/1949 | Keil et al. | 530/385 |
| 4,152,260 | 5/1979 | Mellqvist | 210/767 |
| 4,746,730 | 5/1988 | De Ambrosi et al. | 530/385 |

*Primary Examiner*—Robert A. Wax
*Assistant Examiner*—Richard C. Ekstrom
*Attorney, Agent, or Firm*—Foley & Lardner

[57] ABSTRACT

A substantially heme-free blood protein product is produced by adding an acid to a blood cell suspension to a low pH to disrupt erythrocytes present in the suspension thereby releasing hemoglobin, and to cleave off the heme moiety from the major proportion of the hemoglobin. The released heme forms a precipitate which is removed by centrifugation. Heme moieties remaining in the blood protein solution are degraded by treatment with an oxidizing agent, e.g. hydrogen peroxide. The product has a content of sulfur-containing amino acids which corresponds to the content thereof in natural hemoglobin, as well as foaming and emulsifying properties corresponding to naural hemoglobin. The product has a high lysine content and may be used to enrich the protein content of edible products, e.g. cereals, or to replace part of the meat in meat products. An edible product containing up to about 25% by weight of blood plasma mixed with the product is also disclosed. The product is also useful as a foaming agent, emulsifying agent or additive in chemical industrial products.

9 Claims, 5 Drawing Sheets

PROCESS FOR PRODUCING A SUBSTANTIALLY HEME-FREE BLOOD PROTEIN

FIELD OF INVENTION

The present invention relates to a process for preparing a blood protein from which the heme has substantially been removed, to an edible product containing the thus produced blood protein as well as to the use of the products of said process as an additive in food products and chemical industrial products.

BACKGROUND OF INVENTION

The blood of domestic animals contains about 18% protein and may be regarded as an exploitable protein reserve corresponding to about 6-7% of the lean meat in the animal carcass. In recent years, hygienic blood collecting equipment (Wismer-Pedersen, 1979) has been installed in slaughterhouses in a number of countries in order to harvest this protein reserve. The blood is then separated into a plasma fraction and an erythrocyte fraction by centrifugation and, currently, mainly the plasma fraction is utilized in the meat industry as an additive to various meat products such as sausages.

However, most of the protein content of the blood is present in the erythrocyte fraction which is at present mainly utilized as an animal feed additive since even minor quantities of erythrocytes in food products impart to these an undesirable dark colour and unpleasant odour and taste. It would therefore be desirable to decolorize the erythrocytes so that their protein may be utilized in food products.

Various attempts have been made to decolorize the erythrocyte fraction of blood by removing the heme moiety from the hemoglobin. Thus, Tybor et al. (1975) describe removing the heme group from hemoglobin by means of an acidified acetone solution, while Sato el al. (1981) and Autio (1983) disclose absorption of heme on carboxymethyl cellulose to remove the heme portion of the hemoglobin molecule. These, however, are quite expensive processes and have therefore enjoyed limited commercial success. Alternatively, oxidative degradation, e.g. by means of hydrogen peroxide, has been suggested by Bingold (1949), Oord and Wesdorp (1979) and Mitsyk and Osadchaya (1970). Oxidation of hemoglobin by means of hydrogen peroxide is a very efficient way of removing the heme, but when erythrocytes are used as the starting material, the hemoglobin is protected by the action of catalase which decomposes hydrogen peroxide to water. The use of hydrogen peroxide as an oxidising agent to destroy the heme moiety therefore requires inactivation of the catalase. This has previously been done by reacting the erythrocytes with hydrogen peroxide at a temperature of 50°-70° C. where the catalase becomes inactive. However, this also leads to complete coagulation of the globin (the protein moiety of hemoglobin after removal of the heme moiety) which thereby becomes devoid of any functional properties.

Danish Patent Application No. 5508/86 discloses a process for producing decolorized hemoglobin by mechanical opening of the blood cells, adjusting the pH to 1-2 by means of an acid and adding 1-5% by weight/volume of an oxidising agent, in particular hydrogen peroxide, in the presence of a carbohydrate derivative containing dienol groups, such as ascorbic acid. After oxidation, side products (i.e. cell debris and heme) are optionally removed followed by recovering the decolorized hemoglobin.

European Patent Application, Publication No. 148 114 discloses a process for producing decolorized hemoglobin by treating whole blood in the presence of a proteolytic enzyme at a pH of 3.5-4 to denature the globin chains and thus render the heme portion more accessible to the action of an oxidising agent. The amount of oxidising agent added to the blood is 1% by volume.

French Patent Application No. 2 452 255 discloses treatment of blood with a strong base or a mixture of an oxidising agent and an acid at a pH of about 6.4 followed by filtration.

U.S. Pat. No. 4,180,592 discloses decolorization of blood by treating blood with an excess, e.g. 3-6% by weight, of an oxidising agent such as hydrogen peroxide after which excess peroxide is removed by adding a further amount of blood.

According to the known processes for removing heme from hemoglobin, a relatively high amount of oxidising agent is employed to degrade the heme moiety. This results in oxidation of sulfur-containing amino acids in the protein moiety and hence a decreased solubility and nutritive value of the protein for use as a food additive. Oxidation of the sulfur-containing amino acids may substantially be avoided by adding a dienol group containing compound to the reaction mixture concomitantly with the oxidising agent. Alternatively, the globin may be partially denatured by means of a proteolytic enzyme so that a smaller quantity (about 1%) of oxidising agent is required. However, such compounds are rather expensive and therefore contribute to increasing the cost of the decolorized protein product.

SUMMARY OF THE INVENTION

The present inventor has found that the heme moiety of hemoglobin is, for the most part, cleaved off in the presence of an acid (at a low pH) and forms a precipitate which may easily be removed before treatment with an oxidising agent. This means that a far lower quantity of oxidising agent will be required in a subsequent oxidation step to remove residual heme than in the known methods, thus making it unnecessary to employ other, possibly more expensive, chemicals in the process to protect the protein moiety from oxidation, whereby it has become possible to produce a decolorized blood protein more economically than by the known processes, thus making it commercially interesting to employ it as a food additive or chemical additive.

Accordingly, the present invention relates to a process for producing a substantially heme-free blood protein product, in which process an acid is added to a blood cell suspension to a low pH so as to disrupt erythrocytes present in said suspension to release hemoglobin, and so as to cleave off the heme moiety from the major proportion of the hemoglobin, the released heme polymerizing to form a precipitate, the heme precipitate is removed together with cell debris and optionally other solids, and heme moieties remaining in the resulting blood protein-containing solution are degraded by treatment with an oxidising agent.

In the present context, the term "blood protein product" should be understood to mean a product which, as its major component, comprises erythrocyte protein, either as hemoglobin or, in its substantially heme-free form, as the protein moiety thereof (in the following occasionally referred to as "globin"), but which may also comprise minor quantities of other blood proteins such as residual plasma proteins, or cell membrane components. The term "blood cell suspension" should be understood as a suspension of blood cells, principally erythrocytes, in any suitable liquid. Apart from erythrocytes, the suspension may also comprise other blood components, such as leukocytes, platelets or plasma proteins, and may, for instance, be whole blood or the blood fraction remaining from the separation of plasma, suspended in a suitable liquid such as water, saline, buffer, etc. It should be understood, however, that the process of the invention may also be carried out by using already disrupted erythrocytes or the hemoglobin released therefrom as the starting material and that this is intended to be included in the scope of the present invention. The term "blood protein-containing solution" is intended to indicate that the protein (primarily the erythrocyte protein) is typically present in the solvent liquid remaining after the removal of heme precipitate and cell debris, etc., in dissolved form although, dependent on factors such as the pH of the liquid, the protein may also partially or completely be present in the form of a colloid or suspension thereof. The term "other solids" is intended to include solid blood components such as blood cells (or residues thereof) other than erythrocytes, insoluble plasma components, etc.

A suitable source of the blood protein is the blood of domestic animals, e.g. cattle, swine or sheep, which represents a hitherto largely unexploited protein source.

The present invention further relates to a dried powder as well as a protein-containing solution or suspension which comprises a substantially heme-free blood protein product prepared by the process of the present invention. Still further, the present invention relates to an edible product which comprises said substantially heme-free blood protein product.

DETAILED DISCLOSURE OF THE INVENTION

The pH at which the most efficient cleavage of the released hemoglobin into heme and globin takes place has been found to be a pH of about 1–3.5, preferably a pH of about 2–2.5. Incidentally, this is also the pH at which catalase is inactivated (Carlo-Bondi & Centamori (1954), Shpitsberg (1965)). Inactivation of catalase is required when hydrogen peroxide is employed as the oxidising agent in the subsequent step of the process of the invention, as catalase, which is present when the blood cell suspension used as the starting material contains erythrocytes, decomposes hydrogen peroxide so that, under such circumstances, a process using hydrogen peroxide could either not be carried out at all or only if excessive quantities of hydrogen peroxide were to be used, which would not be desirable as it would cause oxidation of the sulfur-containing amino acids of the protein.

The acid added to the blood cell suspension may be any suitable acid, in particular a strong acid, preferably in diluted from, such as a strong inorganic acid such as hydrochloric acid, hydrobromic acid, nitric acid, sulfuric acid or phosphoric acid or a strong organic acid such as a sulfonic acid or citric, chloroacetic, maleic, tartaric, dihydroxymaleic, dihydroxytartaric, oxalic, o-phthalic, formic or o-hydroxybenzoic acid.

It has been found most convenient for carrying out the process of the invention that the protein concentration of the blood cell suspension is not too high. Thus, a protein concentration of about 2–10%, typically about 5–10%, in particular 7% and especially 6%, by weight of the suspension, has generally been found to be suitable.

The removal according to the invention of the heme precipitate and cell debris from the blood protein-containing solution may suitably be performed by centrifugation or filtration in accordance with conventional methods. Centrifugation is normally preferred, as the protein molecules may tend to block the pores of the filtration equipment. When the separation is performed by centrifugation, suitable g-values are 3000 and higher, e.g. 5000 or higher, such as 8000. In principle, the separation is better the higher the g-value, at least up to relatively high g-values, such as $18,000 \times g$. However, it has also been found that centrifugation at lower g-values, such as 2000 or 1200 or even $800 \times g$, will also bring about the separation, although not necessarily with the same degree of efficiency as is achieved with higher g-values. It has been found that this procedure reduces the content of heme in the erythrocyte protein (which is the main component of the blood protein) to about one fourth of the original content. However, the content of iron in lean meat is about 7 ppm or less than one percent of that of the erythrocyte protein. This means that even replacement of about 1% of the meat in a meat product with the blood protein resulting from the separation of the heme precipitate will double its content of pigment (i.e. the chromophoric heme). Further reduction of the heme content of the erythrocyte protein is therefore required if substantial amounts of the protein are to be incorporated in a meat product without occasioning an undesirable discoloration of the meat product. Thus, the separation step is followed by oxidation of the residual heme in the erythrocyte protein.

Before oxidation, the pH of the protein solution is advantageously adjusted to about 4–5 by adding a base, thereby preserving the solubility of the protein as, at a lower pH, the protein tends to be denatured so that its solubility is reduced and at a higher pH, the protein is sparingly soluble. The base may be selected from an alkali metal or alkaline earth metal hydroxide such as sodium, potassium or calcium hydroxide, an alkali metal or alkaline earth metal carbonate such as sodium, potassium or calcium carbonate or an alkali metal or alkaline earth metal bicarbonate such as sodium, potassium or calcium bicarbonate.

A highly significant feature of the process of the present invention is that due to the removal of the heme precipitate it is possible to employ substantially reduced quantities of the oxidising agent in the subsequent oxidation procedure compared with previously known methods. Thus, the oxidising agent is typically added to the protein solution to a concentration of 0.01–0.35%, preferably 0.04–0.3%, by weight of a protein solution containing 7% by weight of protein. The low amount of oxidising agent needed to substantially provide degradation of the residual heme in the erythrocyte protein presents the advantage that the sulfur-containing amino acids in the protein, cysteine/cystine and methionine, are not oxidized, without necessitating the use of for instance ascorbic acid (the use of which increases the cost of producing the protein) to prevent oxidation of these amino acids. Studies have shown that the content of sulfur-containing amino acids remains unchanged in the oxidised protein. This has the effect that the solubility of the protein is practically not reduced compared to what is normal for globin produced by a non-oxidative process. Similarly, its nutritive value is not impaired compared to that of the non-oxidised protein.

The oxidising agent may suitably be selected from a peroxide such as hydrogen peroxide, sodium peroxide, calcium peroxide, potassium peroxide or magnesium peroxide, oxygen, ozone, atmospheric air, a nitrate, a permanganate or a chlorate. The choice of an appropriate oxidising agent will of course depend on the intended use of the erythrocyte protein. When the protein is to be incorporated in a product intended for human consumption, nitrates, permanganates and chlorates are generally believed to be less suitable as they may leave residues which are not allowed in food products. Nitrates, permanganates or chlorates may, however, be employed when the protein is intended for other uses.

The oxidation may be carried out at a temperature between 4° and 50° C., preferably between 10° and 40° C., and most preferably at about 20° C., to ensure that the reaction is completed within a reasonable period of time while at the same time avoiding a reduction of the solubility of the protein which may occur at higher temperatures.

After the oxidation step, the resulting substantially heme-free erythrocyte protein may be recovered by drying, e.g. fluid-bed drying, freeze-drying, spray-drying or drum-drying, or filtration, e.g. diafiltration, membrane filtration or ultrafiltration. These procedures may be carried out in a manner known per se using conventional methods and apparatus. Prior to drying, it is advantageous to concentrate the protein solution by ultrafiltration. In this step, surplus hydrogen peroxide, iron ions and other electrolytes may be removed from the protein solution. The ultrafiltration may suitably be performed using membranes which allow the passage of molecules having a molecular weight of less than about 20,000. Alternatively, surplus hydrogen peroxide may be removed by the addition of a suitable reductant, e.g. ascorbic acid, or a suitable enzyme, e.g. catalase.

The substantially heme-free blood protein product may be characterized as a partly denatured globin from which the heme moiety has been removed, the globin having food-relevant and other properties, e.g. foaming and emulsifying properties, substantially corresponding to hemoglobin, but with a solubility of about 5–15% w/w at a pH of 6–7, and a content of sulfur-containing amino acids which substantially corresponds to the content of sulfur-containing amino acids found in natural hemoglobin. A typical example of the solubility pattern of the partly denatured globin is shown as the solid line in FIG. 4. An edible product of the invention comprising the substantially heme-free blood protein product may contain up to about 10% by weight of the blood protein product without adversely affecting the quality of the product (expressed in terms of shrinkage and texture after heat treatment). It has been experimentally established that if more than about 10% by weight of the blood protein product is incorporated in the edible product, an unacceptably high shrinkage of the edible product is observed. This is believed to be ascribable to the fact that globin lacks the capacity to form a gel. If, however, a gel-forming substance is added to the edible product, a higher amount of the blood protein product may be added. A suitable gel-forming substance is blood plasma which is accepted for incorporation in food products. Thus, the edible product may contain up to about 25% by weight of blood plasma in admixture with the blood protein product. A suitable ratio of the blood protein product to blood plasma is in the range of 3:1–1:3. A particularly preferred ratio is that in which the two substances are present in whole blood, i.e. about 2:1.

Edible products suited for the incorporation of the substantially heme-free blood protein product prepared by the process of the invention are typically meat products, in particular minced meat products in which the blood protein product has been incorporated to replace part of the meat protein or as a partial or complete substitute for vegetable proteins, e.g. soy proteins, often included in such food products. The edible product may thus be one intended for human consumption such as a sausage-type or corned beef-type product, or one intended as a pet food such as dog or cat food. The blood protein product may either be incorporated in the form of the dried powder or the protein solution or suspension of the invention containing the blood protein product.

Thus, in accordance with the explanation given above, the present invention, in a still further aspect, relates to the use of said substantially heme-free blood protein product as an additive or meat substitute in an edible product. The blood protein product may either be incorporated to enrich the protein content of edible products, for instance to replace or to supplement vegetable proteins present in such products, or to replace part of the meat contained therein. Because of its high lysine content, the blood protein product is suitable for fortification of cereals. For example, addition of the blood protein product in a quantity of 1.5% of the total weight of maize meal increases the biological value of maize protein from 60 to 75% and the net protein utilization from 55 to 69%, when the protein content of the diet is 7%. As the blood protein is substantially heme-free, the edible product containing it has an acceptable colour, taste and odour, whereby the problems of utilizing the erythrocyte fraction of blood in products intended for human consumption are substantially obviated.

However, according to the invention, the blood protein product produced by the instant process is also contemplated to be useful for other purposes than as a food additive. It has been found to possess an excellent emulsion capacity (cf. Example 3) as well as a high foaming capacity. The present invention therefore further relates to the use of the substantially heme-free blood protein product as a foaming agent, emulsifying agent or additive in chemical industrial products such as paint, glue, adhesives, etc.

Contrary to previously described processes of decolorizing hemoglobin, the major part of the heme is not degraded in the present process. The heme precipitate separated from the blood protein-containing solution in the process of the invention may therefore, according to a particular aspect of the invention, be used as a starting material for the isolation of hemin of which the precipitate contains about 20%. Hemin may be isolated from the heme precipitate by conventional procedures. The heme precipitate or the hemin isolated therefrom may be used as a nutritive iron supplement. Apart from this, the isolated hemin may be used for the preparation of synthetic polymers such as synthetic hemoglobins (Dickerson & Chien, 1981) and cyanide ion exchangers (Kokufuta, Watanabe & Nakamura, 1981).

The invention is described in further detail in the following nonlimiting examples.

EXAMPLE 1

Preparation of a substantially heme-free erythrocyte protein

The starting material for producing the substantially heme-free erythrocyte protein was a commercial erythrocyte fraction of swine blood prepared by separating the erythrocytes from plasma by centrifugation, supplied by the Steff-Houlberg meat packing company, Ringsted, Denmark. The erythrocytes were stored at −18° C. until use.

10 kg of the starting commercial erythrocyte fraction were diluted with tap water to a protein concentration of about 7%, and 4N HCl was slowly added to a pH of 2.5-3.5 while stirring. After standing for 20 minutes to permit disruption of the erythrocytes, cleaving off of the heme moiety from the hemoglobin and polymerization and precipitation of the heme, the resulting mixture was subjected to centrifugation at 18,000×g in an International M25 centrifuge to remove the cell debris and heme precipitate.

After centrifugation, the composition of the precipitate and supernatant with respect to globin and heme was compared to that of the starting erythrocytes. The erythrocyte fraction contained 98% hemoglobin consisting of 96% globin and 4% heme. The results are shown in Table 1.

TABLE 1

Composition of supernatant and precipitate from centrifugation of an acidified erythrocyte suspension (pH 2.5) compared to the starting erythrocytes

| | % N in dry matter | % Fe | Approximate composition calculated from N and Fe content |
|---|---|---|---|
| Erythrocytes | 16 | 0.328 | 98% hemoglobin (96% globin + 4% heme) |
| Supernatant from centrifugation | 15.7 | 0.09 | 94% globin + 1% heme |
| Precipitate from centrifugation | 12.6 | 1.7 | 65% globin + 20% heme |

It appears from Table 1 that acidification of the erythrocytes followed by centrifugation reduces the iron content of the protein to 0.09% (about ¼ of the original content). The iron content of the erythrocyte protein was determined by atom absorption after digestion of the protein with nitric acid, and the nitrogen content was determined by the well-known Kjelfoss technique.

The pH of the supernatant containing the dissolved erythrocyte protein was adjusted to about 4-5 to preserve the solubility of the protein by adding 2N NaOH, and a 35% solution of hydrogen peroxide was added to a hydrogen peroxide concentration of between 0.04 and 0.35%. The protein-containing solution was then allowed to stand at 20° C. for 20 hours, at which time the solution had changed colour from brownish black to pale tan, signifying the degradation of the heme moiety. After incubation, the pH of the solution was adjusted to 5, and the substantially heme-free erythrocyte protein was recovered by freeze-drying. The resulting product had a consistency, appearance and taste corresponding to that of dried egg whites.

Experiments investigating the effect of varying the centrifugal force in the International M25 centrifuge on the weight of the precipitate have given the following results:

| Centrifugal force | Amount of precipitate in % w/w |
|---|---|
| 3000 × g | 33 |
| 4500 × g | 32 |
| 6667 × g | 32 |
| 13000 × g | 25 |
| 18000 × g | 15 |

Precipitation of the heme fraction may thus be achieved at a moderate centrifugal force, but the yield of the supernatant protein solution increases with increasing centrifugal force.

EXAMPLE 2

Analysis of reaction conditions during oxidation

Figure 1:
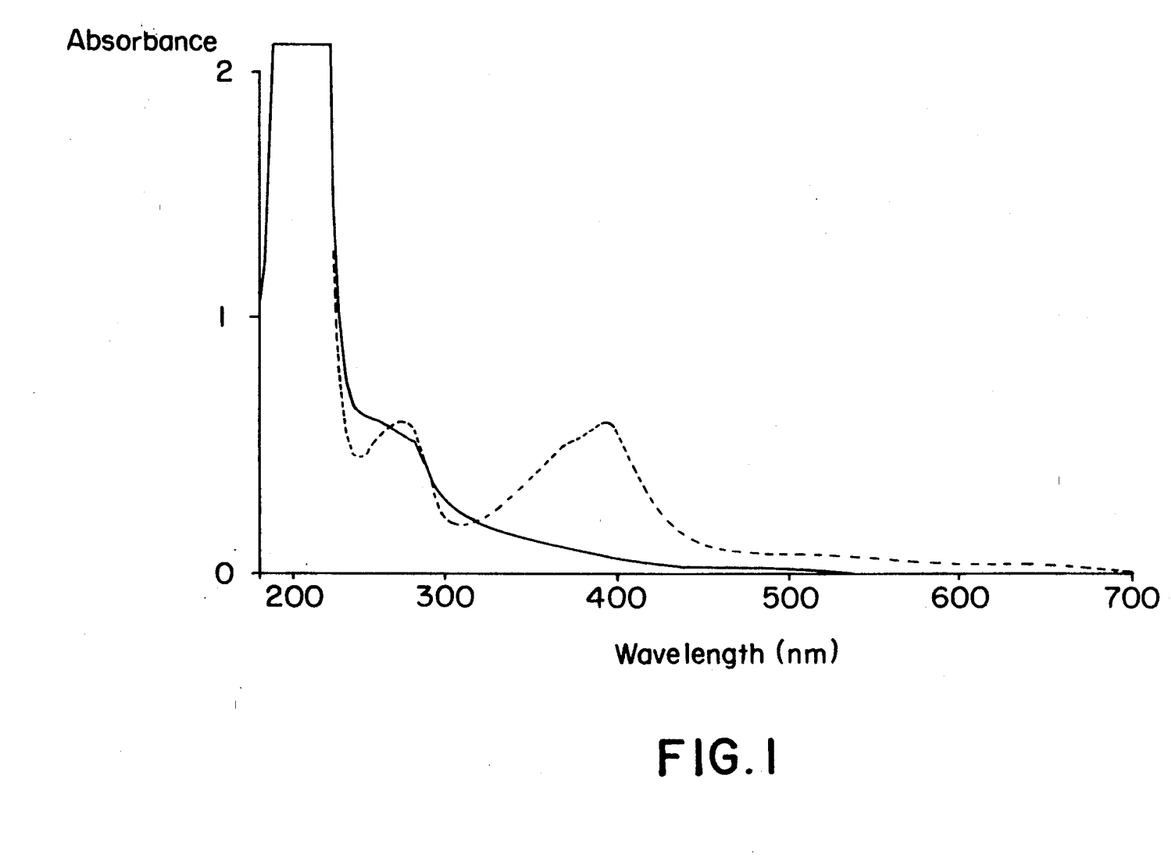
FIG. 1 is a graph showing absorbance spectra of the erythrocyte protein-containing solution before and after treatment with 0.35% $H_2O_2$ for 20 hours at 20° C. The dotted line represents the spectrum before H₂O₂ treatment, and the solid line represents the spectrum after H₂O₂ treatment.

The effect of hydrogen peroxide treatment on the absorbance spectrum of the erythrocyte protein was determined by subjecting an erythrocyte protein-containing solution to spectrophotometry in a Shimadzu UV-240 recording spectrophotometer before and after hydrogen peroxide treatment. The result is shown in FIG. 1 (where the dotted line indicates the erythrocyte protein before hydrogen peroxide treatment, and the solid line indicates the erythrocyte protein after treatment). It appears from the figure that the absorption peaks at 395 nm (thought to be due to absorption of the heme removed from the hemoglobin at pH 2.5) and 275 nm (believed to be caused by absorption of monomeric heme associated with globin (Polet & Steinhard, 1969, and Allis & Steinhard, 1970) and possibly also absorption of tryptophan, tyrosine and phenylalanine which absorb light at approximately 270 nm (Smith, 1929)) disappear after hydrogen peroxide treatment of the erythrocyte protein, the disappearance of the peak at 395 nm signifying the cleavage of the protoporphyrin ring of the heme moiety as a result of the hydrogen peroxide treatment.

Figure 2:
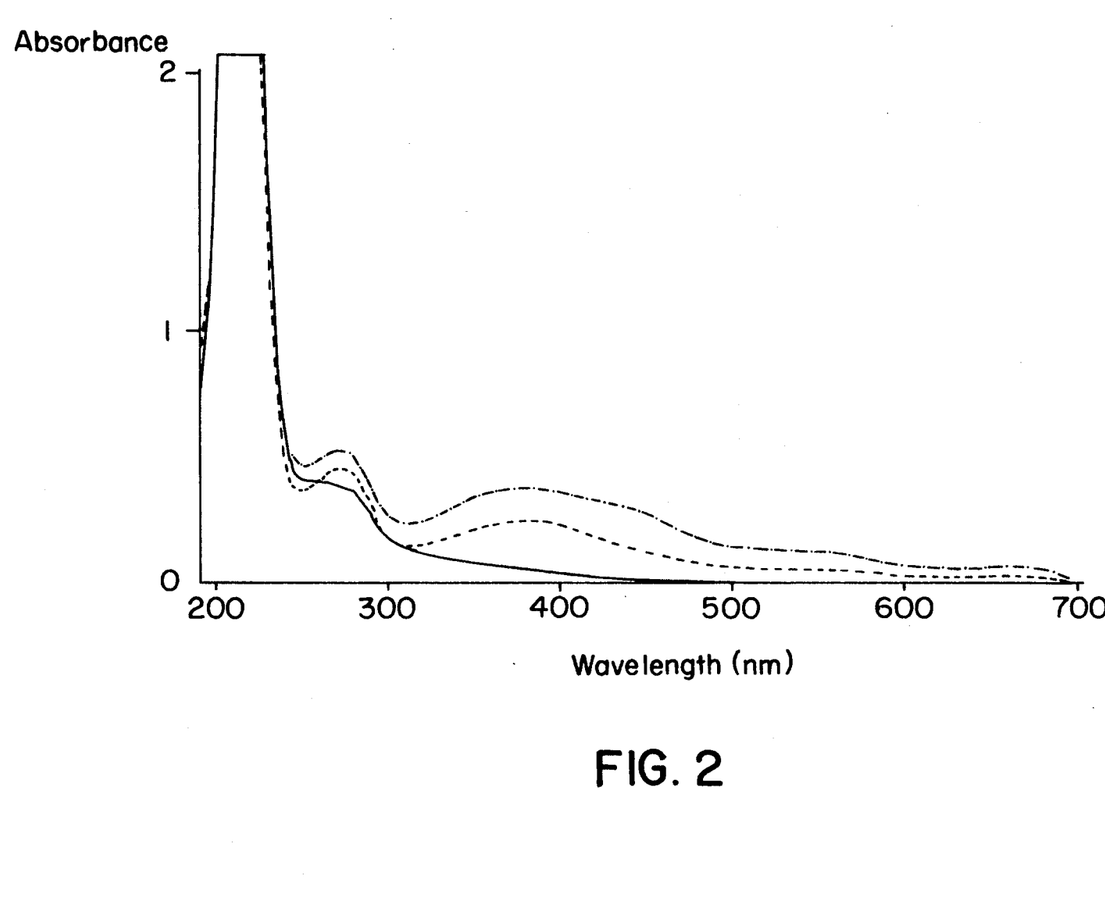
FIG. 2 is a graph showing absorbance spectra of erythrocyte protein-containing solutions treated with 0.35% $H_2O_2$ (—), 0.04% $H_2O_2$ (----) and 0.008% $H_2O_2$ (—.—.) for 20 hours at 20° C.

Further experiments (conducted as described in Example 1) established that complete cleavage of the protoporphyrin ring requires a hydrogen peroxide concentration in the protein-containing solution of 0.2-0.4%. This appears from FIG. 2, where the solid line indicates 0.35% hydrogen peroxide, the dotted line indicates 0.04% hydrogen peroxide, and the —.—. line indicates 0.008% hydrogen peroxide.

Figure 3A:
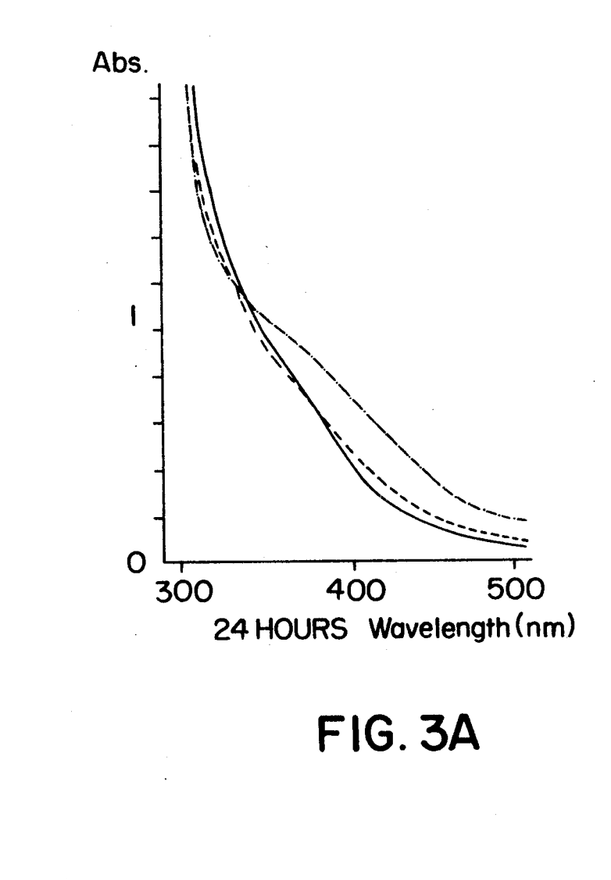
FIG. 3 is a graph showing the effect of temperature on the rate at which oxidation of the erythrocyte protein takes place, measured at 24 and 48 hours. The solid line represents a reaction temperature of 40° C., the dotted line a temperature of 20° C. and the —. —. line a temperature of 4° C.
Figure 3B:
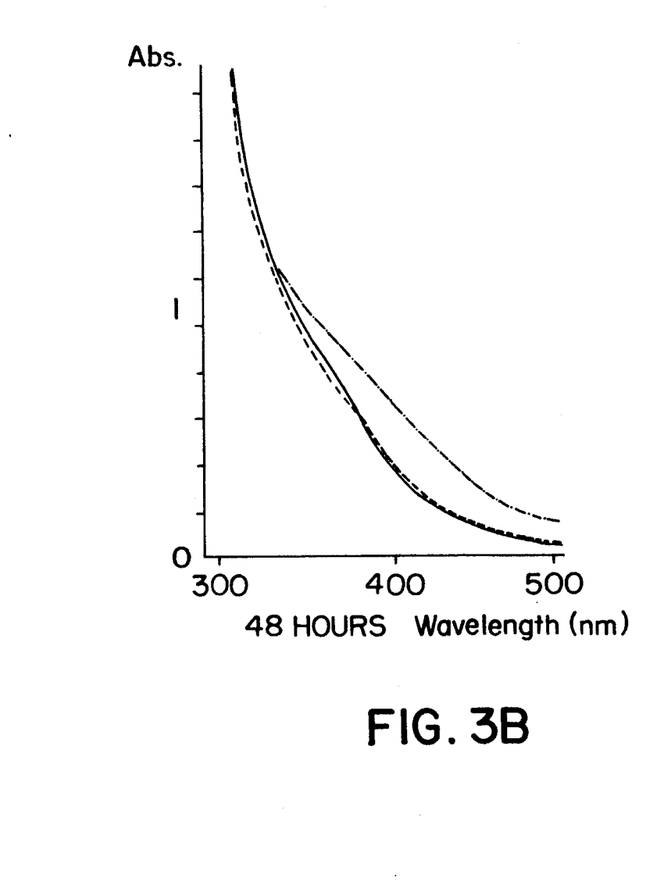

The influence of the temperature at which the oxidation took place on the reaction time was determined by carrying out the oxidation treatment according to Example 1 at temperatures ranging from 4° C. to 40° C. The results are shown in FIG. 3 from which it appears that the protein-containing solution incubated with hydrogen peroxide at 4° C. showed a significantly higher absorption at 395 nm after 24 hours than the corresponding solutions incubated at 20° C. and 40° C. The former solution was also considerably darker in colour when inspected visually than the corresponding solutions incubated at 20° C. and 40° C. After 48 hours, the difference in absorption between the reaction at 4° C. and 40° C. had been somewhat reduced. These results indicate that the reaction proceeds very slowly at 4° C. and requires extended periods of time to reach completion. On the basis of these results, a reaction temperature of 20° C. was established as the preferred on for the present purpose. Although a higher temperature will accelerate the reaction, it may reduce the solubility of the protein.

EXAMPLE 3

Properties of the substantially heme-free erythrocyte protein

The erythrocyte protein produced according to Example 1 was analysed as described by Mason et al. (1980) with respect to its amino acid composition before and after the oxidation treatment since it has previously been shown that incubation of proteins with hydrogen peroxide may result in decomposition of the sulfur-containing amino acids, primarily methionine, in particular at temperature of about 50° C. (Cuq et al., 1973, Rasekh et al., 1972). The results are shown in Table 2.

TABLE 2

The effect of hydrogen peroxide treatment on the amino acid composition of globin

| Amino acid | Globin before $H_2O_2$ incubation g amino acid/16 g N | Globin after $H_2O_2$ incubation g amino acid/16 g N |
| --- | --- | --- |
| alanine | 8.35 | 8.44 |
| arginine | 4.17 | 4.18 |
| aspartic acid | 12.07 | 12.25 |
| cysteine/cystine | 0.638 | 0.641 |
| glutamic acid | 7.95 | 8.14 |
| glycine | 4.84 | 4.90 |
| histidine | 8.10 | 7.95 |
| isoleucine | 0.433 | 0.445 |
| leucine | 13.72 | 13.78 |
| lysine | 8.95 | 8.94 |
| methionine | 0.762 | 0.764 |
| phenylalanine | 6.95 | 6.79 |
| proline | 3.64 | 3.38 |
| serine | 4.66 | 4.66 |
| threonine | 2.97 | 3.00 |
| tryptophan | 1.73 | 0.906 |
| tyrosine | 2.11 | 1.48 |
| valine | 10.06 | 10.24 |
| g amino acid residues per 16 g N | 87.56 | 86.41 |

It appears from Table 2 that the content of sulfur-containing amino acids in the erythrocyte protein has not been reduced as a result of the oxidative treatment with hydrogen peroxide, whereas the content of tryptophan and tyrosine has been reduced to about 50% and 70%, respectively, of the original content. This, however, does not render the erythrocyte protein produced by the process of the invention less suitable as a nutrient as the tryptophan content is still above that of 0.5 g of tryptophan per g of protein recommended (for children) by the FAO (Arrogave, 1974). The decrease in the tryptophan content could be expected as the instability of tryptophan in an acid environment, in particular in the presence of oxidative substances is well known (Olcott and Fraenkel-Conrat, 1947). On the basis of the amino acid composition of the protein after oxidative treatment, it is therefore concluded that the nutritive value of the substantially heme-free protein is comparable to that of the untreated protein.

Figure 4:
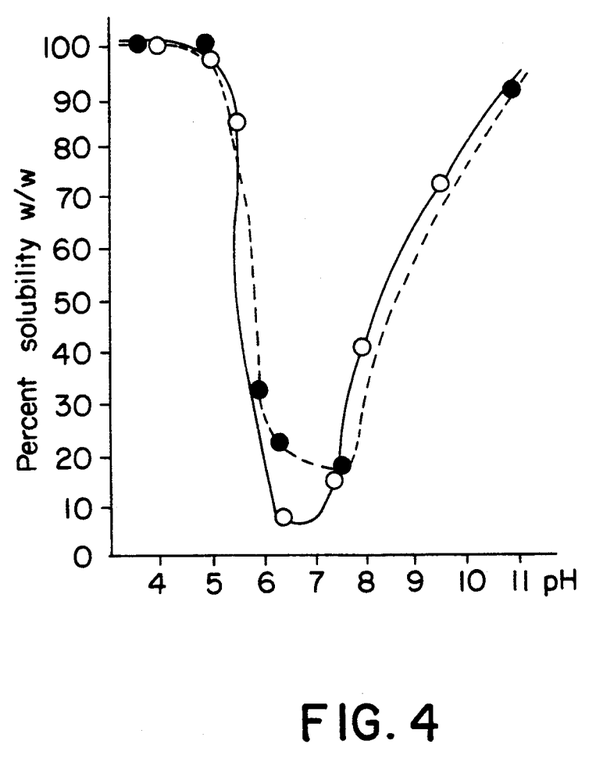
FIG. 4 is a graph showing the solubility of the erythrocyte protein in water relative to the pH of the protein solution. The black circles indicate the solubility of the protein before H₂O₂ treatment, and the white circles indicate the solubility of the protein after H₂O₂ treatment.

The solubility of the erythrocyte protein before and after hydrogen peroxide treatment was determined relative to the pH of the protein solution. The results are shown in FIG. 4. It appears from FIG. 4 that the optimum pH for solubility of the protein both before and after treatment is a pH of about 4, whereas the hydrogen peroxide treatment has slightly reduced the solubility of the protein at a pH of 6–7, possibly due to the formation of —S—S— bonds between peptides by oxidation of SH— groups.

Figure 5:
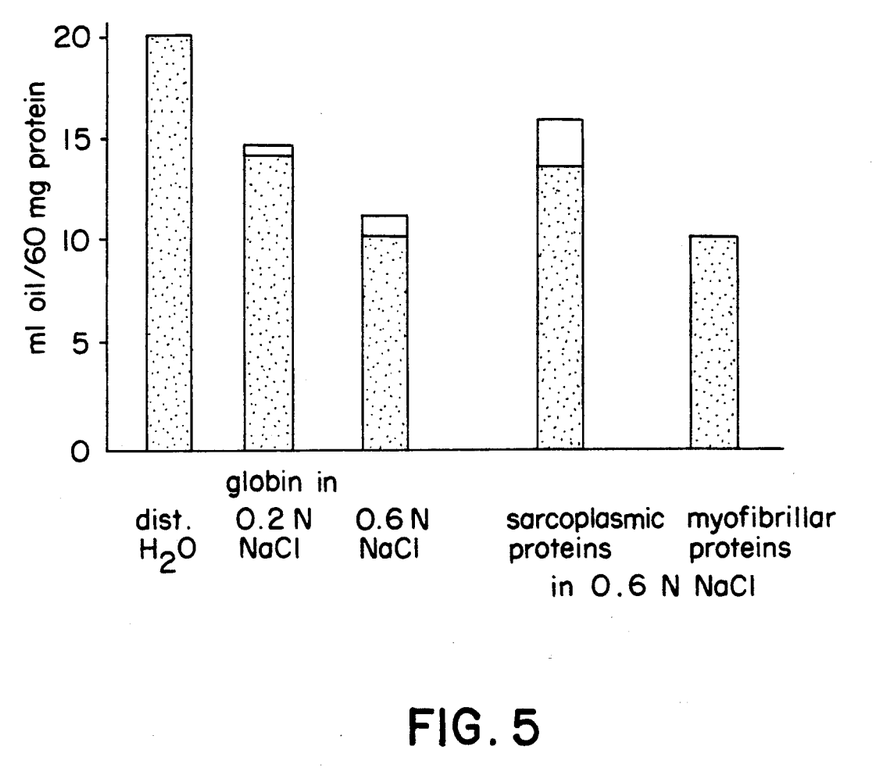
FIG. 5 is a bar chart showing the oil emulsion capacity of the erythrocyte protein at pH 5 compared to meat proteins at pH 6. The bar indicates the emulsion capacity, while the filled-in areas of the bar indicates oil remaining in emulsion after cooking at 70° C. for 15 minutes.

Furthermore, the emulsion capacity of the substantially heme-free protein produced according to Example 1 was compared with that of meat proteins, as determined by the method of Franzen and Kinsella (1976). The results are shown in FIG. 5. It appears from FIG. 5 that the erythrocyte protein has a high oil emulsion capacity in distilled water, whereas its emulsion capacity decreases with increasing NaCl concentrations due to a decreasing solubility of the globin with increasing salt concentration (Autio et al. 1984). At 0.6 N NaCl, the emulsion capacity of the protein corresponds to that of myofibrillar proteins. The erythrocyte protein may thus be useful as an emulsifier.

EXAMPLE 4

Use of the substantially heme-free erythrocyte protein as a meat substitute

A model sausage product was prepared from 128 g of minced lean pork, 42 g of ice water, 72 g of soybean oil and 5 g of NaCl which were emulsified as described by Morrison et al. (1971). Corresponding sausage products were prepared in which about 10% of the meat had been replaced by globin alone or in which about 25% of the meat had been replaced by a mixture of globin and blood plasma in a ratio of about 2:1. The sausage products were filled into cylindrical cans (diameter 55 mm, 35 mm high) which were heated in a water bath at 75°, 85° and 100° C. for 30 minutes. The effect of replacing part of the meat protein in the sausage product by globin alone or by globin in admixture with blood protein is shown in Table 3. The criteria used for evaluating the quality of the products were sausage shrinkage and texture. Sausage texture was determined by means of an Instron material testing machine, Universal Model 1140, equipped with a plunger with a diameter of 35 mm. The texture was measured as the force (kg) required to compress the sausage to 30% of its original length.

TABLE 3

The effect of replacing meat by blood proteins on shrinkage and texture of a model sausage product

| Protein content in the sausage product | Max. temperature during heat treatment | % shrinkage during heat treatment | Texture of cooked sausage expressed as compression force (kg) |
|---|---|---|---|
| Control with 10.37% meat protein | 75° C. | 2.6 | 3.4 |
| | 85° C. | 6.0 | 3.9 |
| | 100° C. | 12.7 | 3.9 |
| 9.38% meat protein | 75° C. | 4.1 | 3.3 |
| 1.06% globin protein | 85° C. | 9.3 | 3.7 |
| 10.44% total protein | 100° C. | 13.6 | 4.1 |
| 7.46% meat protein | 75° C. | 3.5 | 2.4 |
| 2.09% globin protein | 85° C. | 7.5 | 3.2 |
| 0.96% plasma protein | | | |
| 10.51% total protein | 100° C. | 12.3 | 4.2 |

It appears from the table that substitution of 10% of the meat protein by globin leads to increased shrinkage of the sausage product, especially when it is cooked at lower temperatures than 100° C. No effect of the meat substitution on the cooked product could be detected. The higher shrinkage is probably ascribable to the inability of globin to form a gel. When the globin was combined with blood plasma which is capable of forming a gel, it is possible to replace up to about 25% of the meat in the sausage product. The shrinkage and texture of the sausage product is in this case similar to that of the control product, in particular when the product was heated to 100° C. where the gel-forming capacity of blood plasma is highest (Wismer-Pedersen, 1980).

REFERENCES

Allis, J. W. & Steinhard (1970), "Acid denaturation of carboxyhemoglobin. Protein unfolding without heme detachment". Biochemistry 9, 2286.

Arrogave, G. (1974), "Amino acid requirement by age and sex", in "Nutrients in Processed Foods. Part 2 Proteins" (White, Fletcher, Ellis eds.), Publishing Science Group Action Mass., p. 15.

Autio, K. (1983), "A new method for globin and heme preparation from blood corpuscle concentrate", Proceedings 29, European Congress of Meat Research Workers II, p. 765.

Autio, K., Kiesvaara, M., Mälkki, Y., & Kanko, S. (1984), "Chemical and functional properties of blood globin prepared by a new method", J. Food Sci. 49, 859.

Autio, K., Lyytikainen, H., Mälkki, Y. & Kanko, S. (1985), "Penetration studies on blood globin gels", J. Food Sci. 50, 615.

Bingold, K. (1949), "Entstehung des Pentdyopents und seine Bedeutung für den Hämoglobinstoffwechsel", Deutsche Arch. Klin. Med. 195, 413.

Borchers, C. W. A. (1942), German Patent No. 744,055.

Carlo-Bondi & Centamori, M. (1954), "Value of morphological structures on catalase activity", Riv. Biol. 46, 261 (cit CA 49, 2549).

Cuq, J. L., Provansal, M., Guilleux, F. & Cheftel, C. (1973), "Oxidation of methionine residues of casein by hydrogen peroxide", J. Food Sci. 38, 11.

Dickerson, L. C. & Chien, J. C. W. (1981), "Hemin copolymerization with vinyl monomers of potential in artificial hemoglobins", Polymer Preprints 22 (1), 134.

Fischer, H. & v. Dobeneck, H. (1940), "Über die Pentdyopent-Reaktion", Z. Physiol. Chem. 263, 125.

Franzen, K. L. & Kinsella, J. E. (1976), "Functional properties of succinylated and acetylated soy protein", J. Agric. Food Chem. 24, 788.

Heikel, T. (1958) "A paper electrophoretic and paper chromatographic study of pentdyopent", Scand. J. Clin. & Lab. Investigation 10, 191.

Kline, L., Sonoda, T. T. & Hanson, H. L. (1954), "Comparisons of the quality and stability of whole egg powders desugared by the yeast and enzyme methods", Food Technology 9, 343.

Kokufuta, E., Watanabe, H. & Nakamura, I. (1981), "Preparation of copolymer of styrene with hemin and its functional property as cyanide ion exchanger", Polymer Bulletin 4, 603.

Mason, V. C., Bech-Andersen, S. & Rudemo, M. (1980), Z. Tierphysiol., Tierernährung u. Futtermittelkunde 43, 146.

Mitysk, V. E. & Osadchaya, I. F. (1970), USSR Patent 298, 804.

Morrison, G. S., Webb, N. B., Blumer, T. N., Ivey, F. J. & Haq, A. (1971) "Relationship between composition and stability of sausage-type emulsions", J. Food Sci. 36, 426.

Olcott, H. S. & Fraenkel Conrat, H. (1947), J. Biol. Chem. 171, 583.

Oord, A. H. A. van den, & Wesdorp, J. J. (1979), "Decoloration of slaughterhouse blood by treatment with hydrogen peroxide", Proceedings 25, European Meeting of Meat Research Workers, p. 827.

Polet, H. & Steinhard, J. (1969), "Sequential stages in the acid denaturation of horse and human ferrihemoglobins", Biochemistry 8, 857.

Rasekh, J., Stillings, B. R. & Sidewell, V. (1972), "Effect of hydrogen peroxide on the color, composition and nutritive quality of FPC", J. Food Sci. 37, 423.

Sato, Y., Hayakawa, S. & Hayakawa, M. (1981), "Preparation of blood globin through carboxymethyl cellulose chromatography", J. Food Technology 16, 81.

Shpitsberg, V. L. (1965), "Isolation and some chemical properties of catalase from human erythrocytes", Biokhimiya 30, 801 (cit CA 63, 16672).

Smith, F. C. (1929), Proc. Roy. Soc. London B 104, 198.

Tybor, P. T., Dill, C. W. & Landmann, W. A. (1973), "Effect of decolorization and lactose incorporation on the emulsifying capacity of spray-dried blood protein concentrates", J. Food Sci. 38, 4.

Wismer-Pedersen, J. (1979), "Utilization of animal blood in meat products", Food Technol. 33 (8), 76.

Wismer-Pedersen, J. (1980), "Vollausnützung von Schlachttierblut bei der Herstellung von Fleischprodukten", Fleischwirtschaft 60, 652.

We claim:

1. A process for producing a substantially heme-free blood protein product wherein said process comprises the steps of:

(A) adding a strong acid to a blood cell suspension to produce a pH of about 1.0 to 3.5 whereby a heme moiety is cleaved from majority of the hemoglobin in said suspension and said heme moiety forms a precipitate, (B) removing said precipitate thereby producing a blood protein-containing solution, (C) adjusting said blood protein-containing solution to a pH of about 4 to 5 by addition of a base, and (D) degrading remaining heme moieties in said blood protein-containing solution by adding an amount of an oxidizing agent sufficient to degrade said remaining heme moieties.

2. A process according to claim 1, wherein the acid added to the blood cell suspension is a strong inorganic acid such as hydrochloric acid, hydrobromic acid, nitric acid, sulfuric acid or phosphoric acid or a strong organic acid such as a sulfonic acid.

3. A process according to claim 1, wherein the blood cell suspension has a protein concentration by weight of about 2–10%, typically about 5–10%, in particular 7% and especially 6%.

4. A process according to claim 1, wherein the heme precipitate and cell debris are removed by centrifugation or filtration.

5. A process according to claim 1, wherein the base is selected from an alkali metal or alkaline earth metal hydroxide such as sodium, potassium or calcium hydroxide, an alkali metal or alkaline earth metal carbonate such as sodium, potassium or calcium carbonate or an alkali metal or alkaline earth metal bicarbonate such as sodium, potassium or calcium bicarbonate.

6. A process according to claim 1, wherein the oxidising agent is added to the blood protein-containing solution to a concentration of 0.01–0.35% by weight of a protein solution containing 7% by weight of protein.

7. A process according to claim 1, wherein the oxidising agent is selected from a peroxide such as hydrogen peroxide, sodium peroxide, calcium peroxide, potassium peroxide or magnesium peroxide, a nitrate, a permanganate or a chlorate.

8. A process according to claim 1, wherein the oxidation is carried out at a temperature of between 4° and 50° C., preferably between 10° and 40° C. and most preferably at about 20° C.

9. A process according to claim 1, wherein, after the oxidation step, the resulting substantially heme-free blood protein product is recovered by drying, e.g. fluid-bed drying, freeze-drying, spray-drying or drum-drying, or filtration, e.g. diafiltration, membrane filtration or ultrafiltration.

* * * * *